2,974,162
METHOD OF MANUFACTURE OF CYCLOPENTENOPHENANTHRENE COMPOUNDS

Curtis W. De Walt, Jr., and Chester S. Sheppard, Wilkins Township, Allegheny County, Pa., assignors to United States Steel Corporation, a corporation of New Jersey No Drawing. Filed Oct. 21, 1958, Ser. No. 768,538

2 Claims. (Cl. 260—515)

This invention relates to a group of novel compounds containing the cyclopentenophenanthrene nucleus and a method for the manufacture thereof.

This is a continuation-in-part of our application Serial No. 564,649, filed February 10, 1956, now abandoned.

Certain cyclopentenophenanthrene compounds have been known heretofore but the methods for producing them have been complex and difficult as well as costly and time-consuming. It is accordingly the object of our invention to provide a simple, direct method for making such compounds. A further object is the production of certain compounds not previously available.

Generally speaking, our invention comprises the discovery that cyclopentenophenanthrene compounds may be produced directly by the action on phenanthrene of an unsaturated di-carboxylic acid anhydride, under suitable conditions and in the presence of a proper condensing agent. The result of such action is 1'-keto-3'-carboxy-9,10-cyclopentenophenanthrene. This compound may be decarboxylated or reduced to give other related compounds such as 1'-keto-9,10-cyclopentenophenanthrene and 1'-carboxy-9,10-cyclopentenophenanthrene, respectively.

We have found that phenanthrene will react directly with an unsaturated di-carboxylic acid anhydride, e.g., maleic anhydride, in the presence of a liquid diluent or solvent such as nitrobenzene, and a condensing agent of the Friedel-Crafts type such as anhydrous $AlCl_3$.

The reaction of the phenanthrene and the unsaturated acid anhydride may be effected at temperatures from 0 to 100° C., but the preferred temperature range is 0 to 20° C. The solvent or diluent may be any of the common organic solvents employed in Friedel-Crafts type syntheses, such as carbon disulfide, nitrobenzene, methylene chloride, ethylene chloride, and sym-tetrachloroethane, or mixtures of these solvents. Nitrobenzene is the preferred solvent. The catalyst or condensing agent may be any of the known Friedel-Crafts condensing agents, such as anhydrous aluminum chloride, ferric chloride, zinc chloride or mercuric chloride. The preferred agent is aluminum chloride. The quantity of condensing agent may vary from two to twenty moles per mole of phenanthrene, the most likely commercial range being from two to four moles, and the preferred value being about three moles per mole of phenanthrene. The proportions of unsaturated acid anhydride and phenanthrene may vary from one-third mole to three moles of unsaturated acid anhydride per mole of phenanthrene, the preferred ratio being one mole of unsaturated acid anhydride per mole of phenanthrene. The reaction results in 1'-keto-3'-carboxy-9,10-cyclopentenophenanthrene. A specific example in greater detail of the procedure outlined above will be given next.

Example 1

Anhydrous $AlCl_3$ (5.625 g., 0.0422 mole) was dissolved in 25 ml. of dry nitrobenzene and cooled to 10 to 15° C. whereupon 2.225 g. (0.0125 mole) of purified phenanthrene (M.P. 98–100° C.) was added thereto and dissolved. The solution was cooled in an ice bath and stirred during the addition of an ice-cold solution of 1.225 g. (0.0125 mole) of maleic anhydride in 10 ml. of dry nitrobenzene. After 5 hours, the reaction mixture was allowed to warm to room temperature.

After 2 days, 100 ml. of dilute hydrochloric acid was added and the nitrobenzene removed by steam distillation. The aqueous layer was decanted through a filter and the solid product recrystallized from benzene. A 23% yield of a light-brown product melting at 190–192° C. was obtained. This light-brown crude product was twice recrystallized from benzene to yield purified 1'-keto-3'-carboxy-9,10-cyclopentenophenanthrene, M.P. 200–201 (yield, 16%) the composition of which compared to the theoretical as follows:

|  | Found | Calc'd for $C_{18}H_{12}O_3$ |
|---|---|---|
| Percent C | 78.60 | 78.30 |
| Percent H | 4.43 | 4.35 |

Two other compounds may be easily obtained from the product of the above process, viz., 1'-keto-9,10-cyclopentenophenanthrene and 1'-carboxy-9,10-cyclopentenophenanthrene. The procedures for obtaining these products are as given in Examples 2 and 3 below.

Example 2

A mixture of 1 part of 1'-keto-3'-carboxy-9,10-cyclopentenophenanthrene of Example 1 in 50 parts of a 0.1-normal solution of potassium hydroxide in diethylene glycol was heated at 130° C. for 10 minutes. The reaction mixture was cooled, diluted with 2 volumes of water, neutralized with hydrochloric acid, and the product collected on a filter and recrystallized from hexane. The product was crude 1'-keto-9,10-cyclopentenophenanthrene melting at 164 to 168° C. Two further recrystallizations from hexane gave a 34% yield of the purified 1'-keto-9,10-cyclopentenophenanthrene, M.P. 169.6 to 170.6° C., the composition of which compared to the theoretical as follows:

|  | Found | Calc'd for $C_{17}H_{12}O$ |
|---|---|---|
| Percent C | 88.11 | 88.00 |
| Percent H | 5.38 | 5.18 |

The 1'-keto-3'-carboxy-9,10-cyclopentenophenanthrene (0.44 g.) was added to a reducing medium consisting of 4 g. of zinc amalgam, 10 ml. of concentrated hydrochloric acid, 4 ml. of water, and 8 ml. of toluene and the mixture refluxed for 24 hours. The reaction mixture was made basic with potassium carbonate solution and the resultant mixture filtered. Acidification of the filtrate precipitated the product which was recovered by filtration. The crude product was recrystallized from ethanol and from benzene giving a yield of 64% of the purified 1'-carboxy-9,10-cyclopentenophenanthrene, M.P. 297–299° C., which analyzed as follows in comparison to the theoretical composition:

|  | Found | Calc'd for $C_{18}H_{14}O_2$ |
|---|---|---|
| Percent C | 82.10 | 82.50 |
| Percent H | 5.62 | 5.39 |

A series of new compounds, known as esters, may be easily obtained from the product of the above process, e.g., the ethyl ester of 1'-carboxy-9,10-cyclopentenophenanthrene. A procedure for obtaining one of these, specifically the ethyl ester, is given in Example 4 below.

Example 4

A mixture of one part of 1'-carboxy-9,10-cyclopentenophenanthrene of Example 3 in 185 parts of absolute ethanol, 370 parts of toluene, and one part of concentrated sulfuric acid was refluxed for four hours, the water of reaction being removed azeotropically (water-ethanol-toluene). The mixture was evaporated to 18.5 parts, 185 parts of toluene added, and the remaining ethanol removed azeotropically (ethanol-toluene). The toluene solution was washed with water, dried, and concentrated to 74 parts to remove the unreacted carboxy compound by crystallization. The toluene was removed from the remaining solution by evaporation and the residue recrystallized from ether. The product was the crude ethyl ester of 1'-carboxy-9,10-cyclopentenophenanthrene melting at 91.8 to 92.4° C. (yield, 30%). Three further recrystallizations from ethanol-water gave the purified ester, M.P. 95.1 to 95.7° C., the composition of which compared to the theoretical as follows:

|  | Found | Calc'd for $C_{20}H_{18}O_2$ |
|---|---|---|
| Percent C | 82.43 | 82.73 |
| Percent H | 6.33 | 6.25 |

The new cyclopentenophenanthrene compounds disclosed herein are well-defined crystalline materials which may be advantageously employed for a variety of industrial purposes and are particularly valuable as chemical intermediates in the preparation of pharmaceuticals.

The structural formulas for the three compounds are given below for comparison:

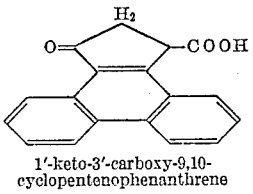
1'-keto-3'-carboxy-9,10-cyclopentenophenanthrene

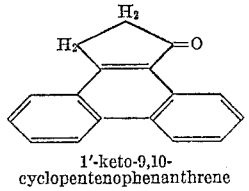
1'-keto-9,10-cyclopentenophenanthrene

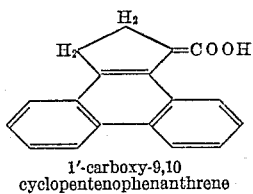
1'-carboxy-9,10 cyclopentenophenanthrene

The keto-acid, 1'-keto-3'-carboxy-9,10-cyclopentenophenanthrene is useful for a bactericidal solution. For this purpose, the keto-acid is treated with sodium hydroxide, sodium carbonate, or sodium bicarbonate to produce the sodium salt thereof. This sodium salt in aqueous solution serves effectively as a bactericidal agent. More particularly, the keto-acid may be converted to a sodium salt as follows. A quantity of the keto-acid is stirred into water containing sodium carbonate, sodium hydroxide or sodium bicarbonate in sufficient quantity to neutralize the acid and thus to form an aqueous solution of its sodium salt. When the bicarbonate is used, heating the solution to speed the reaction is advantageous. The aqueous solution is then diluted to a concentration of from one-quarter to one-half ounce of the sodium salt per gallon of solution. For ordinary use in homes or hospitals, the 0.25-ounce per gallon solution may be applied to a cleaned surface. The 0.5-ounce per gallon solution may be used to disinfect surfaces difficult to clean. It may also be used to disinfect clothing or linens, i.e., after laundering, the clothing or linens are agitated in the solution. Rubber goods may be disinfected by cleaning them thoroughly and then soaking them for 10 minutes in the 0.5-ounce per gallon solution.

It will be apparent from the foregoing that the invention provides several novel compounds based on phenanthrene, as well as simple, quick and direct methods for producing them.

We claim:

1. A method of producing 1'-keto-3'-carboxy-9,10-cyclopentenophenanthrene which comprises bringing phenanthrene into contact with maleic anhydride at a ratio of from ⅓ to 3 moles of anhydride per mole of phenanthrene, at a temperature between 0 and 100° C., in the presence of from 2 to 4 moles of a Friedel-Crafts condensing agent per mole of phenanthrene and acidifying the reaction mixture thereby precipitating 1'-keto-3'-carboxy-9,10-cyclopentenophenanthrene.

2. A method according to claim 1, characterized by the condensing agent being anhydrous aluminum chloride.

References Cited in the file of this patent

UNITED STATES PATENTS

| 2,560,425 | Fracher | July 10, 1951 |
| 2,705,725 | Bible et al. | Apr. 5, 1955 |

OTHER REFERENCES

Elsevier: Ser. III, 14, 291, 294 (1940).

UNITED STATES PATENT OFFICE
CERTIFICATION OF CORRECTION

Patent No. 2,974,162                              March 7, 1961

Curtis W. De Walt, Jr., et al.

It is hereby certified that error appears in the above numbered patent requiring correction and that the said Letters Patent should read as corrected below.

In the grant, lines 1 and 2, for "Curtis W. De Walt, Jr., and Chester S. Sheppard, of Wilkins Township, Allegheny County, Pennsylvania," read -- Curtis W. De Walt, Jr., of Wilkins Township, and Chester S. Sheppard, of Borough of Edgewood, Allegheny County, Pennsylvania, --; in the heading to the printed specification, lines 4 and 5, for "Curtis W. De Walt, Jr., and Chester S. Sheppard, Wilkins Township, Allegheny County, Pa.," read -- Curtis W. De Walt, Jr., Wilkins Township, and Chester S. Sheppard, Borough of Edgewood, Allegheny County, Pa., --; column 2, line 50, insert below the table and in the center of the column "Example 3"; column 3, lines 48 to 50, the upper portion of the formula should appear as shown below instead of as in the patent:

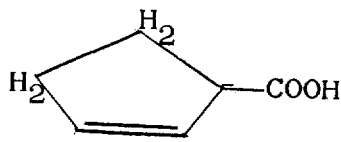

Signed and sealed this 19th day of September 1961.

(SEAL)
Attest:

ERNEST W. SWIDER
Attesting Officer

DAVID L. LADD
Commissioner of Patents